(12) United States Patent
Gammon et al.

(10) Patent No.: US 6,502,885 B1
(45) Date of Patent: Jan. 7, 2003

(54) VEHICLE TAILGATE STORAGE APPARATUS

(75) Inventors: Jim Gammon, Troy, MI (US); Greg Miller, South Lyon, MI (US)

(73) Assignee: Collins & Aikman Products Co., Troy, MI (US)

(*) Notice: Subject to any disclaimer, the term of this patent is extended or adjusted under 35 U.S.C. 154(b) by 0 days.

(21) Appl. No.: 10/010,249

(22) Filed: Dec. 6, 2001

(51) Int. Cl.$^7$ .............................. B60N 3/00; B60R 7/00
(52) U.S. Cl. ................. 296/37.13; 296/37.16; 296/37.6; 224/401; 224/511
(58) Field of Search ................. 296/37.1, 37.6, 296/37.8, 37.13, 37.16, 27.15, 50, 146.8; 224/401, 274, 404, 410, 484, 486, 488, 511, 314, 315

(56) References Cited

U.S. PATENT DOCUMENTS

| | | | |
|---|---|---|---|
| 1,625,011 A | * 4/1927 | Wolfe et al. ............. 131/240.1 |
| 3,061,157 A | * 10/1962 | Moss ........................... 190/39 |
| 4,522,442 A | * 6/1985 | Takenaka .................... 180/215 |
| 4,543,798 A | * 10/1985 | Page ........................... 220/524 |
| 4,750,774 A | * 6/1988 | Pickering .................... 224/401 |
| 4,991,899 A | 2/1991 | Scott ......................... 296/39.2 |
| 5,031,808 A | 7/1991 | Dolenc .................... 224/42.46 |
| 5,154,478 A | 10/1992 | Erickson et al. ........... 296/39.2 |
| 5,395,019 A | * 3/1995 | Christensen ................ 224/319 |
| 5,441,183 A | 8/1995 | Frenzel ....................... 224/542 |
| 5,687,895 A | * 11/1997 | Allison et al. ............. 220/23.4 |
| 5,702,144 A | * 12/1997 | Matsuura et al. ........... 224/311 |
| 5,855,310 A | * 1/1999 | Van Ert et al. ............. 224/275 |
| 5,951,085 A | * 9/1999 | Fukatsu ...................... 296/37.8 |
| 6,007,127 A | 12/1999 | Garofalo .................. 296/26.11 |
| 6,129,401 A | 10/2000 | Neag et al. ................ 296/37.6 |
| 6,139,080 A | 10/2000 | Saffold ....................... 296/37.6 |
| 6,176,540 B1 | 1/2001 | Whittaker ............. 296/100.02 |
| 6,196,605 B1 | * 3/2001 | Baldas et al. ............... 224/543 |
| 6,199,930 B1 | * 3/2001 | Riley .......................... 224/404 |
| 6,305,730 B1 | 10/2001 | Stone ........................ 296/37.6 |
| 6,425,510 B1 | * 7/2002 | King .......................... 224/401 |

OTHER PUBLICATIONS

Deflecta–Shield Aluminum Products Product Brochure, Mar. 1, 2000.

* cited by examiner

Primary Examiner—D. Glenn Dayoan
Assistant Examiner—Patricia L. Engle
(74) Attorney, Agent, or Firm—Myers Bigel Sibley & Sajovec (57) ABSTRACT

Cargo storage apparatus are provided that attach to a tailgate door of an open-air style vehicle and include a housing having a hollow interior portion that serves as a compartment for receiving articles therein. An opening is formed in the housing that allow user access to the compartment. An access door is hingedly coupled to the housing and is movable between a closed position covering the opening and an open position allowing access to the compartment via the opening. A carrying handle may be provided to facilitate portability. Lights may be provided that illuminate inside and outside of the cargo storage apparatus compartment. Cup holders, cargo nets, and supporting hooks, promotional indicia, and thermal insulation may also be provided.

32 Claims, 8 Drawing Sheets

VEHICLE TAILGATE STORAGE APPARATUS

FIELD OF THE INVENTION

The present invention relates generally to vehicles and, more particularly, to cargo management apparatus for use within vehicles.

BACKGROUND OF THE INVENTION

Figure 1:
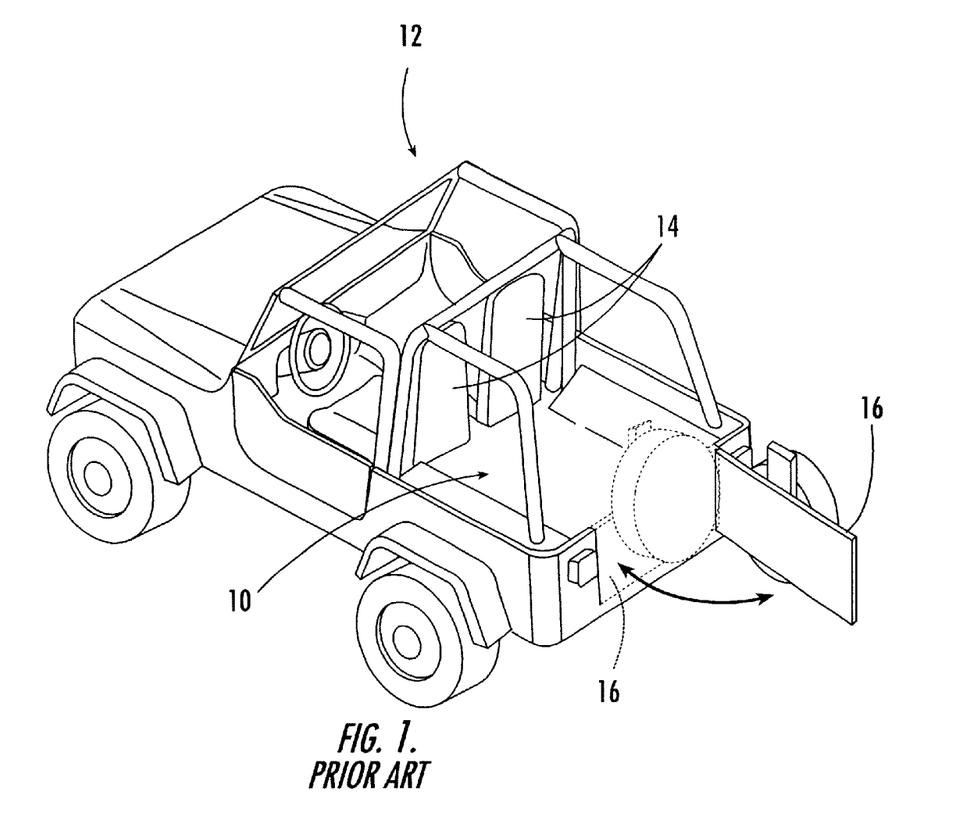
FIG. 1 is a rear perspective view of an exemplary open-air style vehicle illustrating a cargo-carrying area and a pivotable tailgate door.

Open-air style vehicles, such as the Jeep® Wrangler® brand vehicle (Daimler-Chrysler AG, Stuttgart, Germany), have open back ends, and also have removable, canvas tops, which can allow a driver to enjoy the openness of the vehicle while driving. Unlike conventional automobiles, however, open-air style vehicles conventionally do not have lockable, weatherproof, storage trunks for storing items. As illustrated in FIG. 1, the storage- or cargo-carrying area 10 of an open-air style vehicle 12 is defined by the space between the seats 14 and the pivotable tailgate 16. This space is generally very small and not secure. This space may be even smaller if back seats are installed. Although a canvas top is generally provided to shield against rain and direct sunlight, the cargo carrying area 10 typically remains uncovered.

At various times, users of open-air style vehicles may wish to leave items in the vehicle. However, without a secure cargo area, users must either transport the items with them if they leave the vehicle, or risk having them stolen. Accordingly, there is a need for a secure cargo area in open-air style vehicles. In addition, because of the somewhat limited cargo storage space of open-air style vehicles, a need exists to maximize the storage capability of existing cargo storage space without intruding on passenger space.

SUMMARY OF THE INVENTION

In view of the above discussion, a storage apparatus is provided that attaches to a tailgate door of an open-air style vehicle, such as the Jeep® Wrangler® brand vehicle. According to embodiments of the present invention, a tailgate assembly for an open-air vehicle includes a tailgate door that is pivotally secured to an open-air vehicle body and that is movable about a substantially vertical axis between an open position and a closed position, and a weather-resistant cargo storage apparatus secured to an interior portion of the tailgate door.

The cargo storage apparatus includes a housing having an upper wall, a lower wall, a front wall, a rear wall, opposed side walls, and a hollow interior portion that serves as a compartment for receiving articles therein. An opening is formed in the front wall for allowing user access to the compartment. An access door is hingedly coupled to the front wall and is movable between a closed position covering the opening and an open position allowing access to the compartment via the opening. Preferably, the access door seals the compartment from the ingress of moisture and other foreign and/or detrimental material when in the closed position. Preferably, a locking mechanism is provided that is configured to maintain the access door in the closed position and to prevent unauthorized access to the compartment.

According to embodiments of the present invention, the cargo storage apparatus is removably secured to a tailgate door to facilitate portability thereof. A carrying handle may also be provided to facilitate carrying by a user.

According to embodiments of the present invention, a cargo storage apparatus may be provided with one or more lights configured to illuminate the cargo storage apparatus compartment. In addition, one or more lights may be provided to illuminate areas adjacent the cargo storage apparatus. For example, a light and/or safety reflector may be mounted on the front wall of the housing and/or on one of the side walls and may be configured to illuminate the cargo carrying area of an open-air vehicle and/or other areas external to the cargo storage apparatus.

According to embodiments of the present invention, a cargo storage apparatus may be provided with one or more cup holders. Cup holders may be integrally formed within portions of the cargo storage apparatus housing and/or may be separate attachments thereto. According to embodiments of the present invention, one or more receptacles configured to receive articles therein may be provided. Receptacles may be integrally formed within portions of the cargo storage apparatus housing and/or may be separate attachments thereto.

According to embodiments of the present invention, a cargo storage apparatus may be provided with one or more projections (e.g., hooks) extending therefrom that are configured to support articles, such as grocery bags and the like, suspended therefrom. Such projections may be integrally formed with the cargo storage apparatus housing and/or may be separate attachments thereto.

According to embodiments of the present invention, a cargo storage apparatus may be provided with promotional indicia (e.g., advertising, logos, sports team names, designs, messages, etc.) on the housing thereof.

According to embodiments of the present invention, a cargo storage apparatus may be provided with one or more cargo nets for removably retaining items between the cargo net and the cargo storage apparatus housing. Cargo nets may be attached to various portions of the housing, internally and/or externally. For example, a cargo net may be attached to one or more of the housing side walls and/or to the housing front wall and/or within the compartment.

According to embodiments of the present invention, the walls of a cargo storage apparatus may include thermal insulation material such that the compartment can serve as a food and beverage cooler. A drain opening may be provided that is in fluid communication with the compartment and that is configured to allow fluid within the compartment to be drained therefrom. A removable drain plug for normally closing the drain opening is preferably provided.

Cargo storage apparatus according to embodiments of the present invention can provide a secure way to store items in open-air vehicles and can provide additional cargo storage space without intruding on passenger space. Moreover, cargo storage apparatus according to embodiments of the present invention may be lightweight and may be designed for quick and easy installation and removal from a tailgate door of a vehicle.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 2:
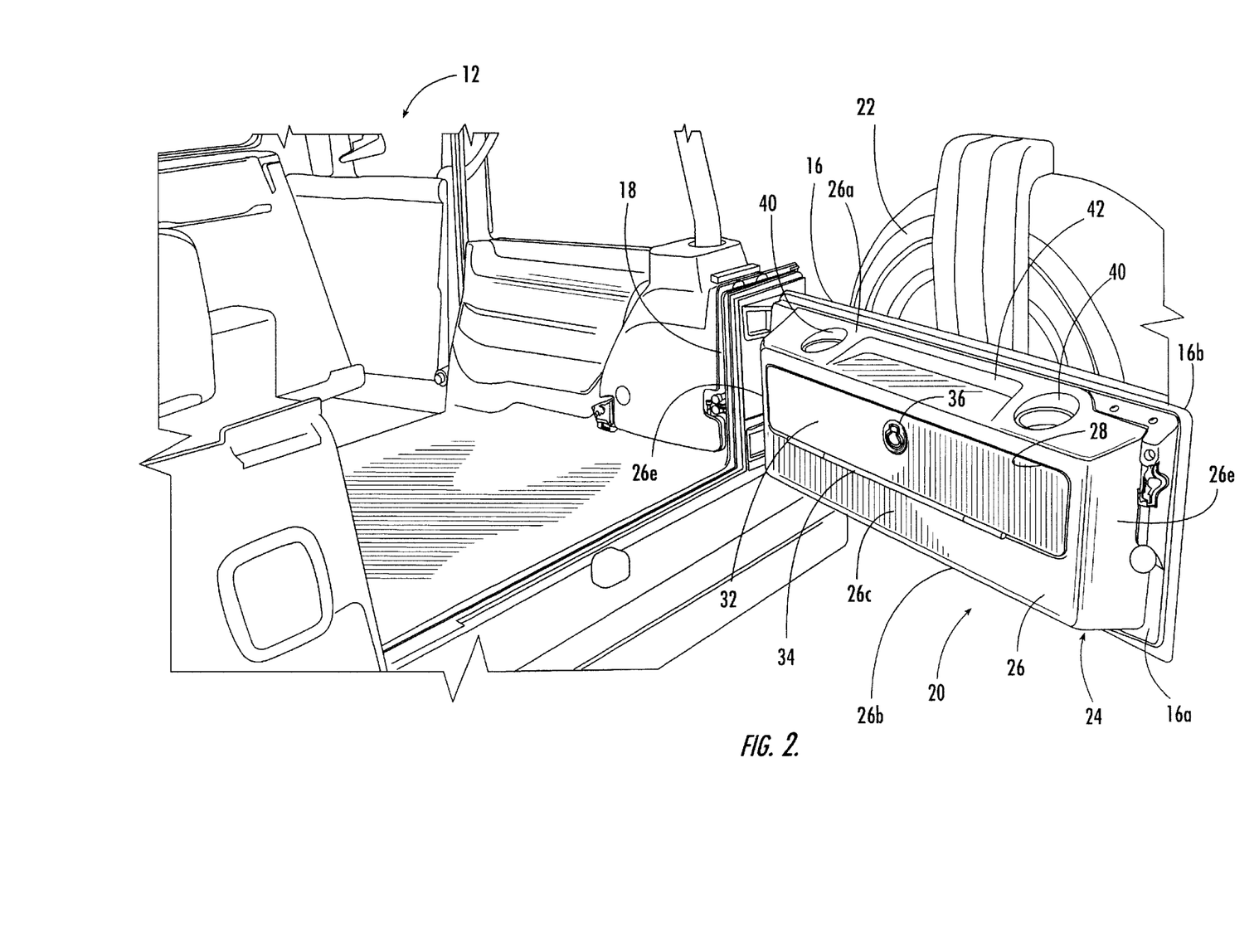
FIGS. 2–8 are perspective views of a tailgate having a cargo storage apparatus according to various embodiments of the present invention secured thereto.

Referring now to FIG. 2, a tailgate assembly 20 for an open-air style vehicle 12 according to embodiments of the present invention is illustrated. A tailgate door 16 is pivotally secured to the body 18 of the open-air vehicle 12 and is movable about a substantially vertical axis between an open position and a closed position, as is understood by those skilled in the art. The tailgate door 16 includes an interior portion 16a and an external portion 16b. A spare tire 22 is mounted on the illustrated tailgate door external portion 16b.

A weather-resistant cargo storage apparatus 24 is secured to the tailgate door interior portion 16a. The cargo storage apparatus 24 includes a housing 26 having an upper wall 26a, a lower wall 26b, a front wall 26c, a rear wall 26d, and opposed side walls 26e which define a hollow interior portion that serves as a cargo storage compartment 30 (FIG. 4) for receiving articles therein. The cargo storage apparatus 24 may be permanently secured to the tailgate door interior portion 16a, such as at the time of manufacture of the vehicle, or may be removably secured thereto to facilitate removal therefrom.

An opening 28 is formed in the illustrated front wall 26c that allows access to the cargo storage compartment 30. An access door 32 is pivotally secured to the front wall 26c via hinge 34 and is movable between a closed position covering the opening 28 and an open position 28 allowing access to the compartment 30 via the opening 28. Preferably, the access door 32 is configured to seal the compartment 30 from the ingress of moisture, dirt, and other deleterious material when in the closed position. A weather seal or strip (not illustrated) may be utilized to facilitate sealing of the compartment 30, as would be understood by those skilled in the art. A locking mechanism 36 may be provided according to embodiments of the present invention to maintain the access door 32 in the closed position and to prevent unauthorized access to the compartment 30.

Cargo storage apparatus according to embodiments of the present invention may have various shapes and configurations and are not limited to the various illustrated embodiments. In addition to various shapes, sizes and configurations, a cargo storage apparatus housing may have one or more openings allowing access to one or more internal compartments. These openings may be in various locations and are not limited to the housing front wall 26c. For example, an access door may overlie an opening formed within one of the side walls 26e and/or in the upper wall 26a.

Multiple cargo storage apparatus may be secured to a vehicle tailgate according to embodiments of the present invention. For example, a first cargo storage apparatus may be permanently mounted to a tailgate and a second cargo storage apparatus may be removably mounted to the tailgate to facilitate portability. The second cargo storage apparatus may serve the function of a food and beverage cooler.

The illustrated cargo storage apparatus housing 26 includes a pair of cup holders 40 formed within the housing upper wall 26a. In addition, the illustrated cargo storage apparatus housing 26 includes a receptacle 42 formed within the upper wall 26a that is configured to receive articles therein. However, it is understood that a cargo storage apparatus according to embodiments of the present invention may have various types and configurations of cup holders and/or small article receptacles.

Figure 3:
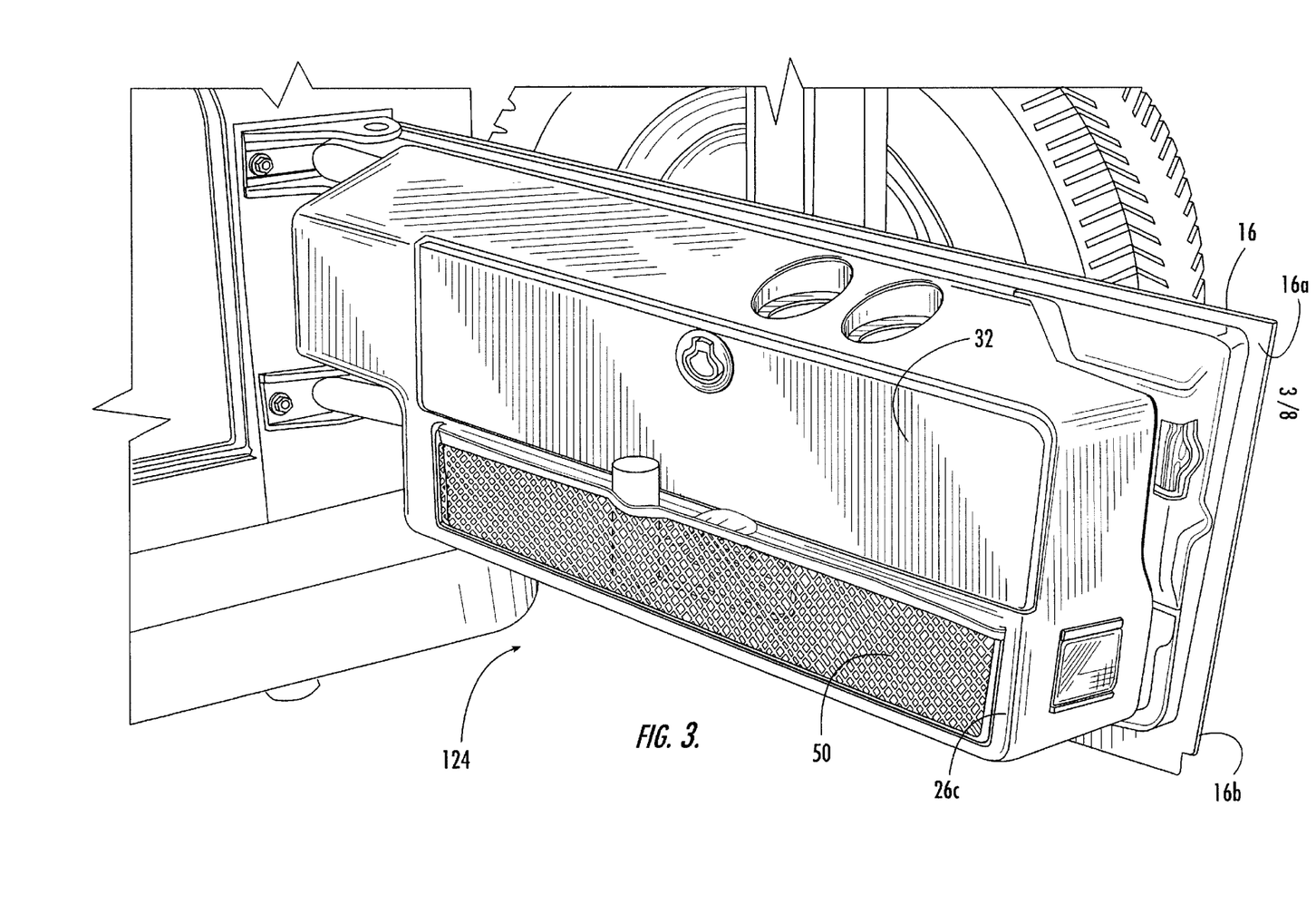

Referring to FIG. 3, a weather-resistant cargo storage apparatus 124 according to embodiments of the present invention includes a cargo net 50 secured to the housing front wall 26c for removably retaining items between the cargo net 50 and the front wall 26c. However, it is understood that other embodiments of the present invention may include a cargo net attached to other portions of the housing 26. For example, a cargo net may be attached to one or more of the side walls 26e and/or to the upper wall 26a. According to embodiments of the present invention, a cargo net may be attached to the outside and/or inside portion of the access door 32. According to embodiments of the present invention, a cargo net may be attached to various locations within the compartment 30.

Figure 4:
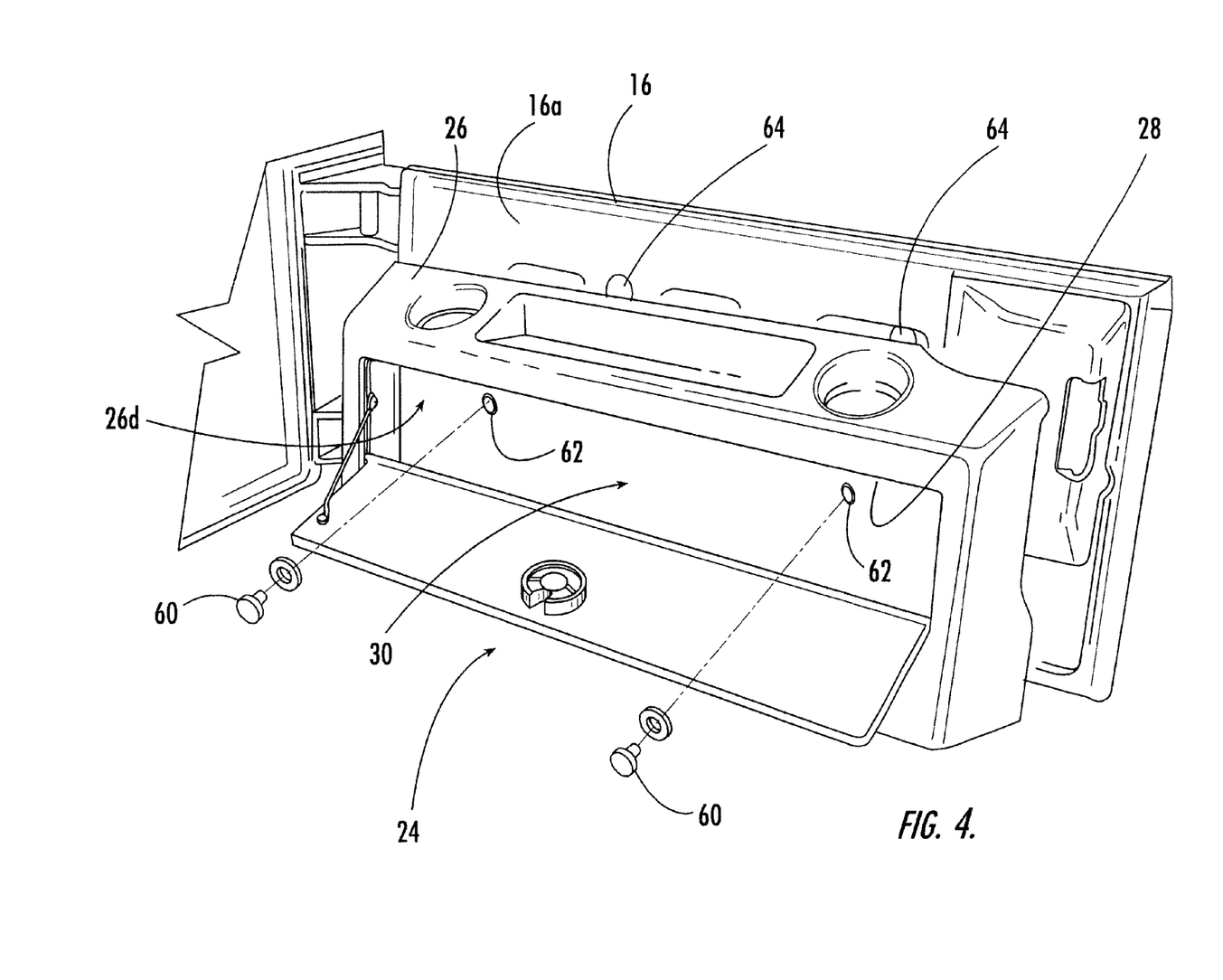

As illustrated in FIG. 4, bolts 60 extend through apertures 62 in the rear wall of the housing 26 and threadingly engage respective nuts 64 attached to the tailgate door 16 for securing the cargo storage apparatus 24 thereto. However, a cargo storage apparatus according to embodiments of the present invention may be secured to the interior portion 16a of a tailgate door 16 in various ways including, but not limited to, fasteners (e.g., rivets, bolts, screws, etc.) and adhesives. Moreover, fasteners that facilitate easy removal and installation of a cargo storage apparatus may be provided and are within the scope of knowledge of those skilled in the art.

Figure 5:
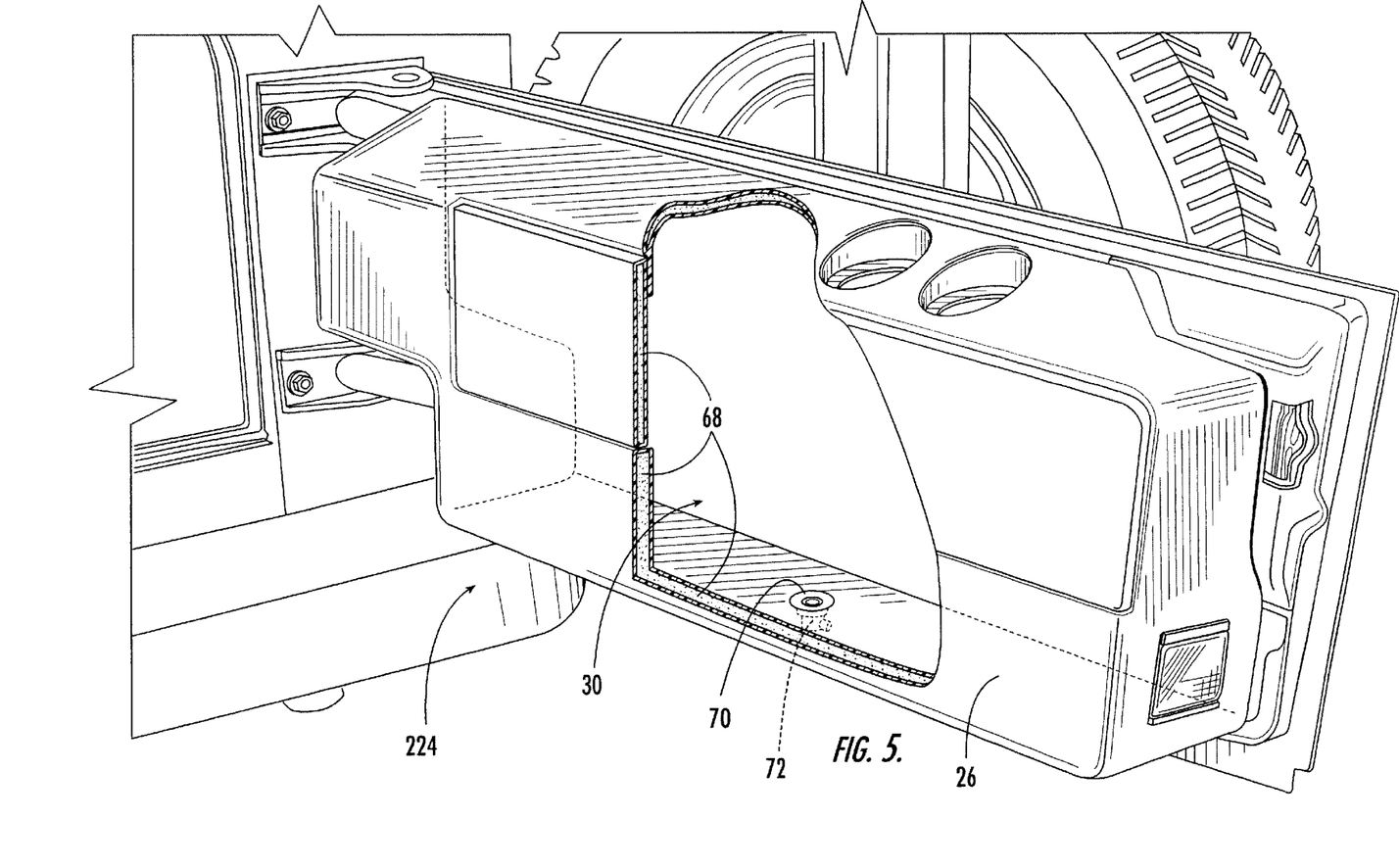

Referring to FIG. 5, a cargo storage apparatus 224 according to embodiments of the present invention is illustrated. Various ones of the housing walls of the illustrated cargo storage apparatus 224 contain thermal insulation material 68 such that the compartment 30 can serve as a food and beverage cooler. Also in the illustrated embodiment, a drain opening 70 is formed in the housing lower wall 26b that is in fluid communication with the compartment 30 and that is configured to allow fluid within the compartment to be drained therefrom, such as when the compartment 30 is utilized as a cooler. A removable drain plug 72 for normally closing the drain opening 70 is provided, as illustrated. A drain and corresponding drain plug may be located at any of various locations and are not limited to the illustrated location. Moreover, various types of drains and corresponding drain plugs may be utilized without limitation.

Figure 6:
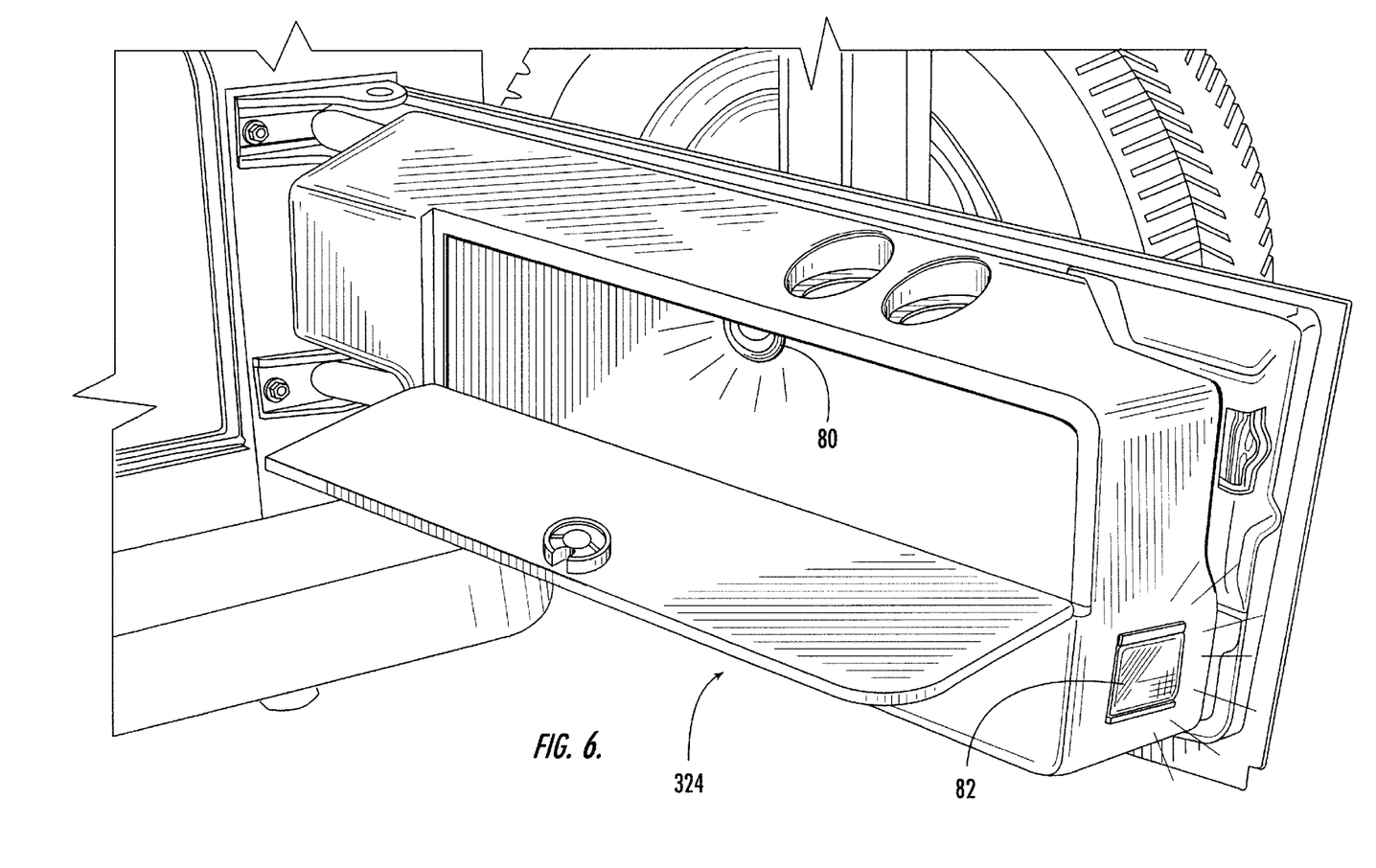

Referring to FIG. 6, a cargo storage apparatus 324 according to embodiments of the present invention includes a light 80 disposed within the housing 26 that is configured to illuminate the compartment 30. In the illustrated embodiment, a light 82 is attached to one of the side walls 26e to illuminate areas adjacent the cargo storage apparatus 324. Various combinations and types of lights may be utilized within the spirit and intent of the present invention. For example, one or more lights and/or safety reflectors may be provided to illuminate the compartment 30 and/or one or more external lights may be mounted to the housing 26 at various locations.

Figure 7:
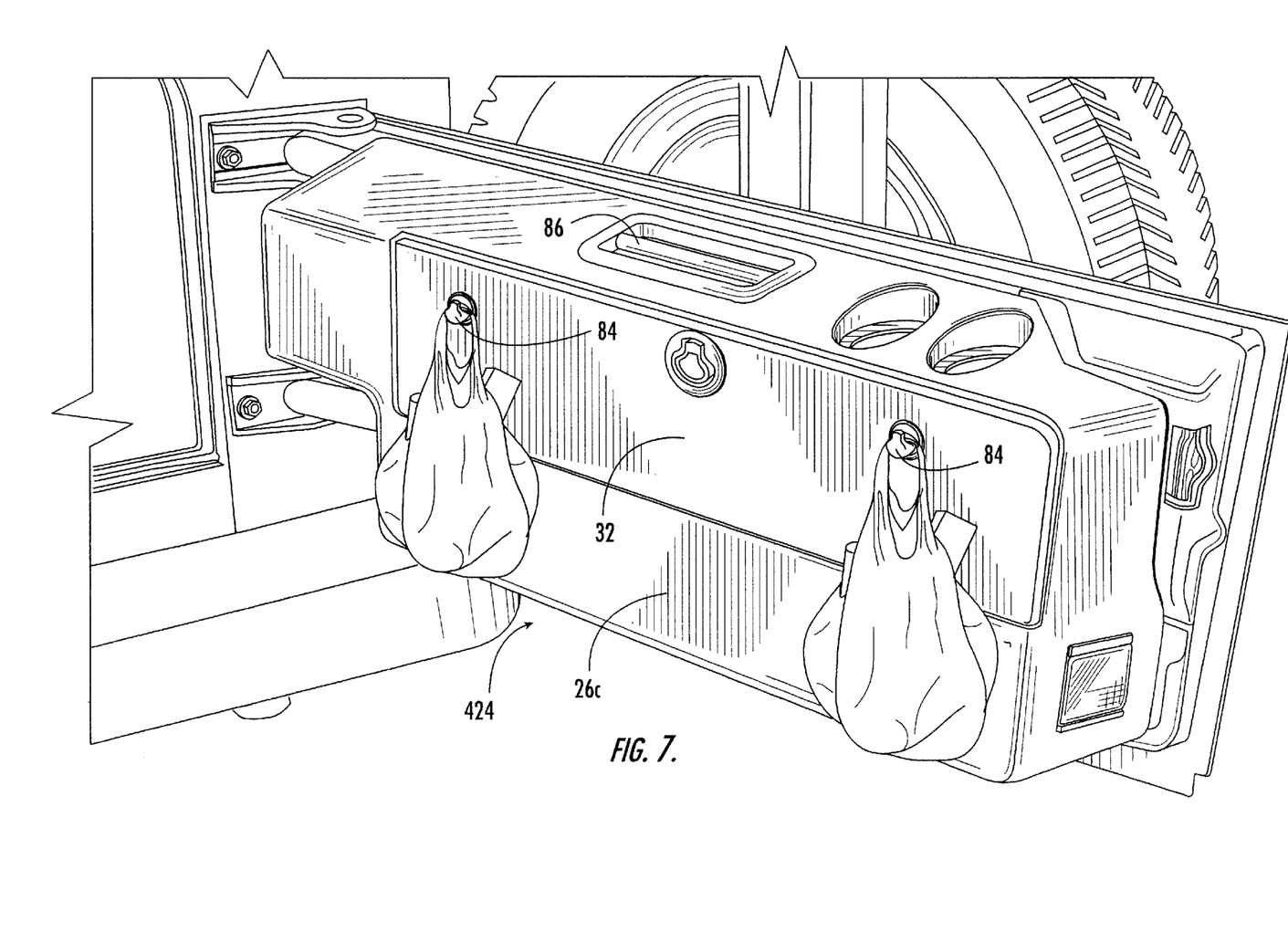

Referring to FIG. 7, a cargo storage apparatus 424 according to embodiments of the present invention includes a pair of projections 84 (e.g., hooks) extending from the access door 32 attached to the housing front wall 26c that are configured to support articles suspended therefrom, such as grocery bags and the like. The illustrated cargo storage apparatus 424 also includes a carrying handle 86 that permits a user to carry the cargo storage apparatus 424 when removed from the tailgate door 16.

Figure 8:
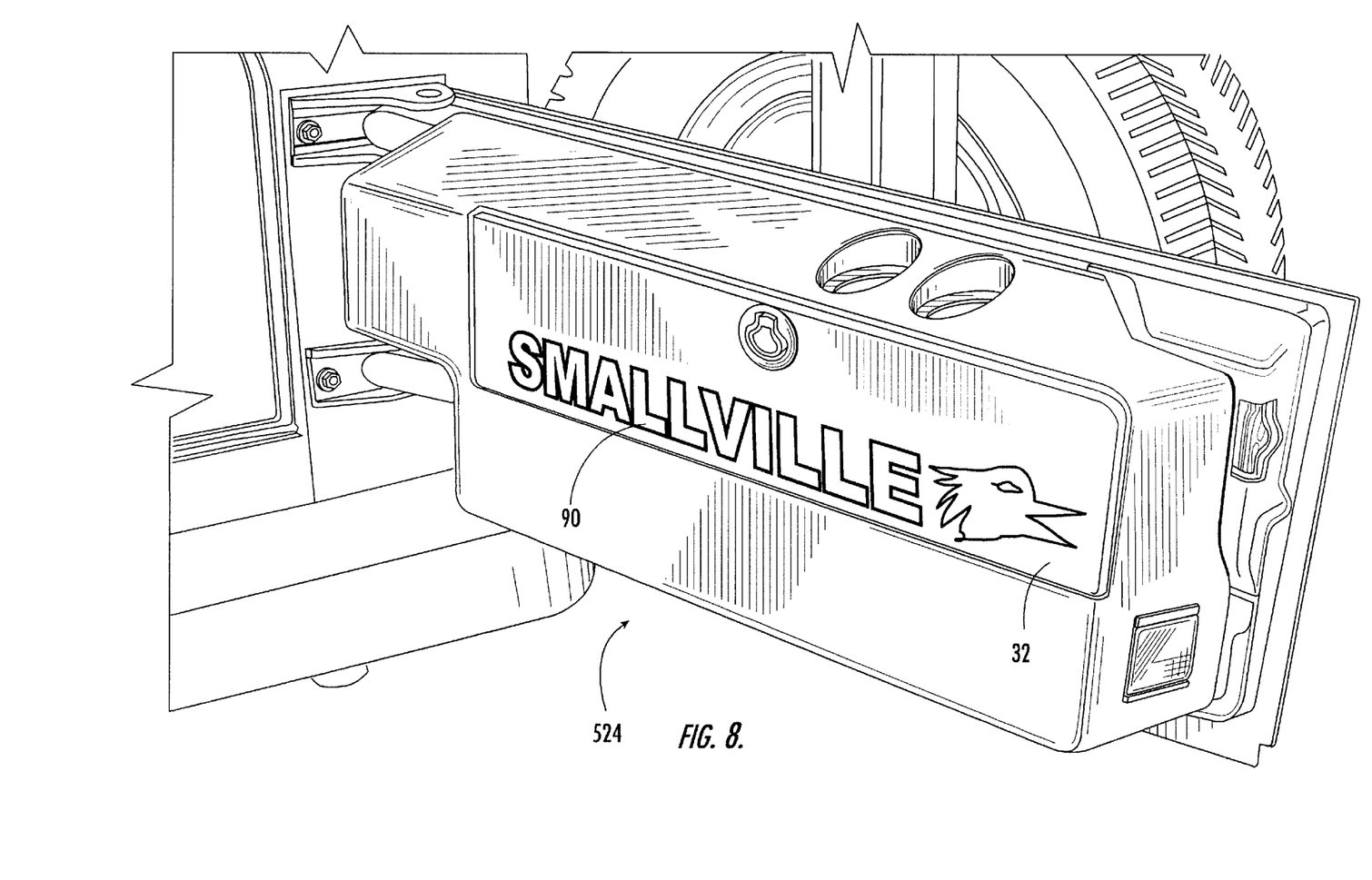

Referring to FIG. 8, a cargo storage apparatus 524 according to embodiments of the present invention includes promotional indicia (e.g., advertising, logos, sports team names, designs, messages, etc.) 90 on the housing 26 thereof. In the illustrated embodiment, the promotional indicia 90 comprises a professional sports team logo and is positioned on the access door 32.

It is understood that cargo storage apparatus according to the present invention may incorporate various combinations of the above-described embodiments. The present invention is not limited to the exact illustrated embodiments. Moreover, cargo storage apparatus according to embodiments of the present invention may be utilized with any type of tailgate door for any type of vehicle.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A tailgate assembly for an open-air vehicle, comprising:
   a tailgate door pivotally secured to an open-air vehicle body and movable about a substantially vertical axis between an open position and a closed position, wherein the tailgate door comprises an interior portion; and
   a weather-resistant cargo storage apparatus secured to the tailgate door interior portion, wherein the cargo storage apparatus comprises:
      a housing, comprising an upper wall, a lower wall, a front wall having an opening therein, a rear wall, opposed side walls, and a hollow interior portion that serves as a compartment for receiving articles therein, wherein the housing is configured to be removably secured to an interior portion of a tailgate of an open-air vehicle;
      an access door hingedly coupled to the front wall and movable between a closed position covering the opening and an open position allowing access to the compartment via the opening, wherein the access door seals the compartment from moisture ingress when in the closed position;
      a drain opening in fluid communication with the compartment that is configured to allow fluid within the compartment to be drained therefrom; and
      a removable drain plug for normally closing the drain opening.

2. The tailgate assembly of claim 1, further comprising a locking mechanism configured to maintain the access door in the closed position and to prevent unauthorized opening of the access door.

3. The tailgate assembly of claim 1, further comprising a light disposed within the housing that is configured to illuminate the compartment.

4. The cargo storage apparatus of claim 1, further comprising a light attached to the housing that is configured to illuminate areas adjacent the cargo storage apparatus.

5. The tailgate assembly of claim 1, wherein the housing comprises one or more cup holders.

6. The tailgate assembly of claim 1, wherein the housing comprises a receptacle formed therein that is configured to receive articles therein.

7. The tailgate assembly of claim 1, wherein the housing comprises at least one projection extending therefrom that is configured to support articles suspended therefrom.

8. The tailgate assembly of claim 1, wherein the housing comprises thermal insulation material such that the compartment can serve as a food and beverage cooler.

9. The tailgate assembly of claim 1, further comprising a cargo net secured to the housing for removably retaining items between the cargo net and the wall.

10. The tailgate assembly of claim 1, wherein the housing comprises a carrying handle attached thereto that permits a user to carry the cargo storage apparatus when removed from the tailgate door interior portion.

11. The tailgate assembly of claim 1, wherein the housing comprises promotional indicia.

12. A weather-resistant, secure cargo storage apparatus for an open-air vehicle, comprising:
   a housing, comprising an upper wall, a lower wall, a front wall having an opening therein, a rear wall, opposed side walls, and a hollow interior portion that serves as a compartment for receiving articles therein, wherein the housing is configured to be removably secured to an interior portion of a tailgate of an open-air vehicle;
   an access door hingedly coupled to the front wall and movable between a closed position covering the opening and an open position allowing access to the compartment via the opening, wherein the access door seals the compartment from moisture ingress when in the closed position;
   a locking mechanism configured to maintain the access door in the closed position and to prevent unauthorized opening of the access door;
   a carrying handle attached to the housing that permits a user to carry the cargo storage apparatus when removed from the tailgate interior portion;
   a drain opening in fluid communication with the compartment that is configured to allow fluid within the compartment to be drained therefrom; and
   a removable drain plug for normally closing the drain opening.

13. The cargo storage apparatus of claim 12, further comprising a light disposed within the housing that is configured to illuminate the compartment.

14. The cargo storage apparatus of claim 12, wherein the housing comprises one or more cup holders.

15. The cargo storage apparatus of claim 12, wherein the housing comprises a receptacle formed therein that is configured to receive articles therein.

16. The cargo storage apparatus of claim 12, wherein the housing comprises at least one projection extending therefrom that is configured to support articles suspended therefrom.

17. The cargo storage apparatus of claim 12, wherein the housing comprises thermal insulation material such that the compartment can serve as a food and beverage cooler.

18. The cargo storage apparatus of claim 12, further comprising a cargo net secured to the housing for removably retaining items between the cargo net and the wall.

19. The cargo storage apparatus of claim 12, wherein the housing further comprises promotional indicia.

20. A weather-resistant, secure cargo storage apparatus for an open-air vehicle, comprising:
   a housing, comprising an upper wall, a lower wall, a front wall having an opening therein, a rear wall, opposed side walls, and a hollow interior portion that serves as a compartment for receiving articles therein, wherein the housing comprises thermal insulation material such that the compartment can serve as a food and beverage cooler, and wherein the housing is configured to be removably secured to an interior portion of a tailgate of an open-air vehicle;

a drain opening in fluid communication with the compartment that is configured to allow fluid within the compartment to be drained therefrom; and a removable drain plug for normally closing the drain opening;

an access door hingedly coupled to the front wall and movable between a closed position covering the opening and an open position allowing access to the compartment via the opening, wherein the access door seals the compartment from moisture ingress when in the closed position; and a carrying handle attached to the housing that permits a user to carry the cargo storage apparatus when removed from the tailgate interior portion.

21. The cargo storage apparatus of claim 20, further comprising a locking mechanism that is configured to maintain the access door in the closed position and to prevent unauthorized opening thereof.

22. The cargo storage apparatus of claim 20, wherein the housing comprises one or more cup holders.

23. The cargo storage apparatus of claim 20, wherein the housing comprises promotional indicia.

24. A tailgate assembly for an open-air vehicle, comprising:

a tailgate door pivotally secured to an open-air vehicle body and movable about a substantially vertical axis between an open position and a closed position, wherein the tailgate door comprises an interior portion; and a weather-resistant cargo storage apparatus secured to the tailgate door interior portion, wherein the cargo storage apparatus comprises:

a housing, comprising an upper wall, a lower wall, a front wall having an opening therein, a rear wall, opposed side walls, and a hollow interior portion that serves as a compartment for receiving articles therein, wherein the housing is configured to be removably secured to an interior portion of a tailgate of an open-air vehicle;

an access door hingedly coupled to the front wall and movable between a closed position covering the opening and an open position allowing access to the compartment via the opening, wherein the access door seals the compartment from moisture ingress when in the closed position, and at least one projection extending from the housing that is configured to support articles suspended therefrom.

25. A tailgate assembly for an open-air vehicle, comprising:

a tailgate door pivotally secured to an open-air vehicle body and movable about a substantially vertical axis between an open position and a closed position, wherein the tailgate door comprises an interior portion; and a weather-resistant cargo storage apparatus secured to the tailgate door interior portion, wherein the cargo storage apparatus comprises:

a housing, comprising an upper wall, a lower wall, a front wall having an opening therein, a rear wall, opposed side walls, and a hollow interior portion that serves as a compartment for receiving articles therein, wherein the housing is configured to be removably secured to an interior portion of a tailgate of an open-air vehicle;

an access door hingedly coupled to the front wall and movable between a closed position covering the opening and an open position allowing access to the compartment via the opening, wherein the access door seals the compartment from moisture ingress when in the closed position; and a cargo net secured to the housing for removably retaining items between the cargo net and the wall.

26. A tailgate assembly for an open-air vehicle, comprising:

a tailgate door pivotally secured to an open-air vehicle body and movable about a substantially vertical axis between an open position and a closed position, wherein the tailgate door comprises an interior portion; and a weather-resistant cargo storage apparatus secured to the tailgate door interior portion, wherein the cargo storage apparatus comprises:

a housing, comprising an upper wall, a lower wall, a front wall having an opening therein, a rear wall, opposed side walls, and a hollow interior portion that serves as a compartment for receiving articles therein, wherein the housing is configured to be removably secured to an interior portion of a tailgate of an open-air vehicle;

an access door hingedly coupled to the front wall and movable between a closed position covering the opening and an open position allowing access to the compartment via the opening, wherein the access door seals the compartment from moisture ingress when in the closed position; and a light mounted within the housing that illuminates the compartment.

27. A tailgate assembly for an open-air vehicle, comprising:

a tailgate door pivotally secured to an open-air vehicle body and movable about a substantially vertical axis between an open position and a closed position, wherein the tailgate door comprises an interior portion; and a weather-resistant cargo storage apparatus secured to the tailgate door interior portion, wherein the cargo storage apparatus comprises:

a housing, comprising an upper wall, a lower wall, a front wall having an opening therein, a rear wall, opposed side walls, and a hollow interior portion that serves as a compartment for receiving articles therein, wherein the housing is configured to be removably secured to an interior portion of a tailgate of an open-air vehicle;

an access door hingedly coupled to the front wall and movable between a closed position covering the opening and an open position allowing access to the compartment via the opening, wherein the access door seals the compartment from moisture ingress when in the closed position; and a light attached to one of the upper, lower, front, or side walls exterior to the housing and that illuminates areas adjacent the cargo storage apparatus.

28. A tailgate assembly for an open-air vehicle, comprising:

a tailgate door pivotally secured to an open-air vehicle body and movable about a substantially vertical axis between an open position and a closed position, wherein the tailgate door comprises an interior portion; and a weather-resistant cargo storage apparatus secured to the tailgate door interior portion, wherein the cargo storage apparatus comprises:

a housing, comprising an upper wall, a lower wall, a front wall having an opening therein, a rear wall, opposed side walls, and a hollow interior portion that serves as a compartment for receiving articles therein, wherein the housing is configured to be removably secured to an interior portion of a tailgate of an open-air vehicle, and wherein an exterior of the housing upper wall comprises one or more cup holders; and an access door hingedly coupled to the front wall and movable between a closed position covering the opening and an open position allowing access to the compartment via the opening, wherein the access door seals the compartment from moisture ingress when in the closed position.

29. A weather-resistant, secure cargo storage apparatus for an open-air vehicle, comprising:

a housing, comprising an upper wall, a lower wall, a front wall having an opening therein, a rear wall, opposed side walls, and a hollow interior portion that serves as a compartment for receiving articles therein, wherein the housing is configured to be removably secured to an interior portion of a tailgate of an open-air vehicle;

an access door hingedly coupled to the front wall and movable between a closed position covering the opening and an open position allowing access to the compartment via the opening, wherein the access door seals the compartment from moisture ingress when in the closed position;

a locking mechanism configured to maintain the access door in the closed position and to prevent unauthorized opening of the access door;

a carrying handle attached to the housing that permits a user to carry the cargo storage apparatus when removed from the tailgate interior portion; and at least one projection extending from the housing that is configured to support articles suspended therefrom.

30. A weather-resistant, secure cargo storage apparatus for an open-air vehicle, comprising:

a housing, comprising an upper wall, a lower wall, a front wall having an opening therein, a rear wall, opposed side walls, and a hollow interior portion that serves as a compartment for receiving articles therein, wherein the housing is configured to be removably secured to an interior portion of a tailgate of an open-air vehicle;

an access door hingedly coupled to the front wall and movable between a closed position covering the opening and an open position allowing access to the compartment via the opening, wherein the access door seals the compartment from moisture ingress when in the closed position;

a locking mechanism configured to maintain the access door in the closed position and to prevent unauthorized opening of the access door;

a carrying handle attached to the housing that permits a user to carry the cargo storage apparatus when removed from the tailgate interior portion; and a cargo net secured to the housing for removably retaining items between the cargo net and the wall.

31. A weather-resistant, secure cargo storage apparatus for an open-air vehicle, comprising:

a housing, comprising an upper wall, a lower wall, a front wall having an opening therein, a rear wall, opposed side walls, and a hollow interior portion that serves as a compartment for receiving articles therein, wherein the housing is configured to be removably secured to an interior portion of a tailgate of an open-air vehicle;

an access door hingedly coupled to the front wall and movable between a closed position covering the opening and an open position allowing access to the compartment via the opening, wherein the access door seals the compartment from moisture ingress when in the closed position;

a locking mechanism configured to maintain the access door in the closed position and to prevent unauthorized opening of the access door;

a carrying handle attached to the housing that permits a user to carry the cargo storage apparatus when removed from the tailgate interior portion; and a light mounted within the housing that illuminates the compartment.

32. A weather-resistant, secure cargo storage apparatus for an open-air vehicle, comprising:

a housing, comprising an upper wall, a lower wall, a front wall having an opening therein, a rear wall, opposed side walls, and a hollow interior portion that serves as a compartment for receiving articles therein, wherein the housing is configured to be removably secured to an interior portion of a tailgate of an open-air vehicle, and wherein an exterior of the housing upper wall comprises one or more cupholders;

an access door hingedly coupled to the front wall and movable between a closed position covering the opening and an open position allowing access to the compartment via the opening, wherein the access door seals the compartment from moisture ingress when in the closed position;

a locking mechanism configured to maintain the access door in the closed position and to prevent unauthorized opening of the access door; and a carrying handle attached to the housing that permits a user to carry the cargo storage apparatus when removed from the tailgate interior portion.

* * * * *